Nov. 10, 1964  J. J. DAILEY  3,156,099
FLUID DISTRIBUTION ELEMENTS
Filed March 10, 1961  3 Sheets-Sheet 1

INVENTOR
JOHN J. DAILEY
BY Raymond Wootten
ATTORNEY

Nov. 10, 1964  J. J. DAILEY  3,156,099
FLUID DISTRIBUTION ELEMENTS
Filed March 10, 1961  3 Sheets-Sheet 2

INVENTOR
JOHN J. DAILEY
BY Raymond W. Colton
ATTORNEY

Nov. 10, 1964  J. J. DAILEY  3,156,099
FLUID DISTRIBUTION ELEMENTS
Filed March 10, 1961

INVENTOR
JOHN J. DAILEY
BY
ATTORNEY

United States Patent Office 3,156,099
Patented Nov. 10, 1964

3,156,099
FLUID DISTRIBUTION ELEMENTS
John J. Dailey, 1209 Woodcrest Lane, Arlington, Tex.
Filed Mar. 10, 1961, Ser. No. 94,819
3 Claims. (Cl. 61—14)

The present invention relates to fluid distribution elements and more particularly to flume elements useful for lining irrigation ditches or the like.

Irrigation is now commonly used by all kinds of farmers and truck-gardeners, both large and small, for purposes of increasing the yield of the soil and conserving the supply of water. Many irrigation ponds have been constructed and irrigation ditches for effective distribution of the stored water have been dug. In order to minimize the loss of water by percolation through the soil, the ditches and ponds are often lined with a liquid impermeable material and for this purpose thin plastic films have been used. In the west and southwest portions of the United States, it is particularly important to line the irrigation ponds and ditches because of the comparative shortage of water and of the extreme porosity of the dry and sandy soils prevalent in such areas.

The use of thin plastic film liners for irrigation ditches has a number of serious problems and disadvantages. For example, it is very difficult to install a thin film liner in a ditch, particularly on windy days. Some means must be provided for temporarily anchoring the film in place until the ditch is filled with water and for preventing the lining from creeping during use. Also, irrigation ditches lined with a thin plastic film liner should be suitably fenced in cattle areas since the film is very easily punctured and even when being constructed, care must be taken not to walk on the film liner and to make sure that the ditch is free of sharp or pointed material that could puncture the liner. Furthermore, when using the plastic film lining, it is difficult to provide for the removable installation of transverse dam paddles that are customarily used at various points along the irrigation ditch to locally raise the level of water for purposes of siphoning or the like.

It is a principal object of the present invention to provide an improved plastic flume element that may be used for lining irrigation ditches or the like and which will avoid the above-mentioned difficulties normally present when using plastic film linings.

It is an important object of the invention to provide an interchangeable plastic flume element such that a plurality of the flume elements may be removably joined together in various combinations to form a desired lining for an irrigation trench or the like.

Yet another object of the invention is to provide a plastic flume or trench lining that may be easily and quickly installed or removed from an irrigation ditch or the like.

Still another object of the invention is to provide an improved plastic flume or trench lining that is self-supporting and will resist punctures to a greater extent than conventional film linings.

A further object of the invention is to provide an improved plastic flume useful for irrigation trench lining having means to facilitate the removable attachment of transverse dam paddles as desired.

A still further object of the invention is to provide a plastic flume of self-supporting semi-rigid material yet so arranged and constructed as to permit a useful amount of flexing along its longitudinal axis.

In practicing the invention according to a presently preferred embodiment thereof, a flume element of self-supporting semi-rigid plastic material is formed with a trough-like cross section in readily-handled lengths. Near one end of the flume an interlocking formation is molded on the upper surface and near the other end a complementary interlocking formation is molded on the lower surface so that a plurality of such flume elements may be interchangeable and removably joined together when placed in an irrigation ditch. In accordance with the invention, plastic flume elements may also be formed with side outlets intermediate their ends which may also have suitable interlocking formations molded on an upper or lower surface for joining to additional plastic flume elements in the manner of a T joint. In addition selected ones of the interchangeable flume elements may be provided with transverse grooves molded on their inner trough surfaces so that removable dam paddles may be easily inserted and removed as desired. Also, when flexibility along the longitudinal axis of each plastic flume element is desired, a plurality of bellows-like transverse folds or corrugations may be molded into the flume element for such purpose.

Further objects, features and the attending advantages of the invention will be apparent with reference to the following specification and drawings in which.

Figure 1:
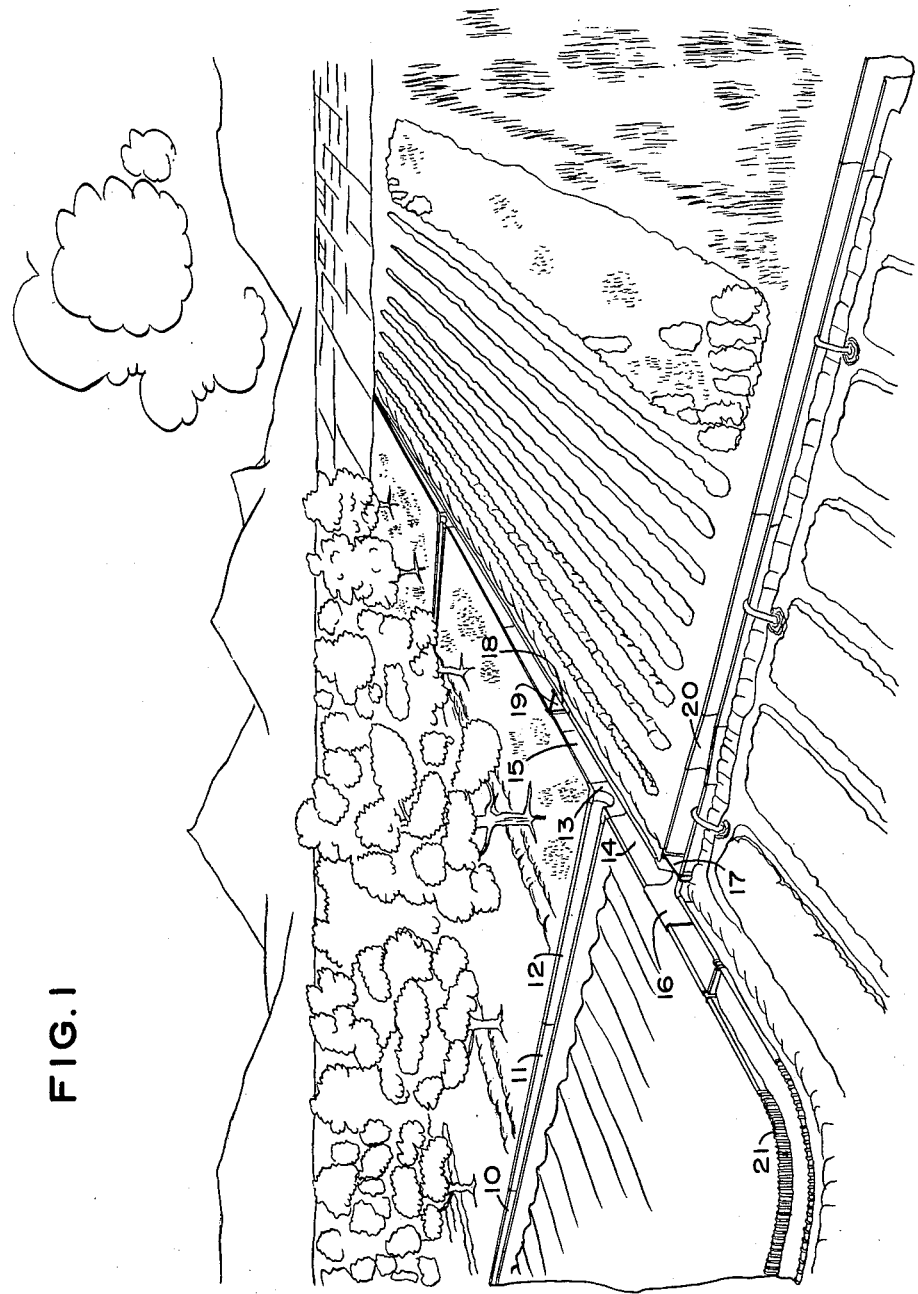
FIG. 1 is a plan view showing a farm area having irrigation ditches installed and lined with the interchangeable plastic flume elements of the invention.

Referring to FIG. 1 of the drawings a typical irrigation ditch network for a truck garden farm is shown as it may be arranged to use the plastic flume liners of the invention. A series of interchangeable plastic flume liners 10, 11 and 12 may be joined together in a ditch leading from a source of water (not shown) to the plastic T joint 13 joined to plastic flume elements 14 and 15. The plastic flume element 14 may be joined to the T joint element 16 having provisions for a removable dam paddle 17 in its outlet leg or branch. The plastic flume element 15 may be joined to the plastic flume element 18 having provisions for a removable dam paddle 19. A plastic flume reducer element 20 having a reducing flume cross-section is shown in the ditch extending from the side outlet of the T 16. Also, a flexible plastic flume element 21 is shown having transverse folds or corrugations along its length to permit flexing along its longitudinal axis such as to bend in the direction to the right as shown.

In accordance with the invention, each of the plastic flume elements such as the elements 10–16, 18, 20 and 21 described above is formed of semi-hard chemically inert plastic material of sufficient thickness to form self-supporting interchangeable units. For example, the flume elements may be formed of a semi-rigid, stabilized linear polymerizing thermoplastic material. Examples of such plastic materials are the commonly known and available polyethylene, polyvinyl-chloride or butyrate plastics. Obviously, the invention is not limited to the choice of a particular plastic material although various of the above materials may be preferred for a given application. The use of self-supporting chemically inert material for the flume elements has the advantages of light weight, long life, and resistance to damage due to the inherent resilience of such materials.

For example, when using polyethylene plastic, the flume component or element may be molded to a thickness of approximately one-sixteenth of an inch which will result in the formation of a self-supporting strong element to enable repeated usage of the flume elements in lining irrigation ditches and changing the ditch layout from time to time. Obviously the thickness of the flume element will depend upon the strength of the plastic material and the intended use. In any event, it should be apparent that a plastic flume element molded in accordance with the invention will resist puncture considerably more than the previously used plastic film liners and, being self-supporting, will be considerably easier to install in irrigation ditches.

Figure 2:
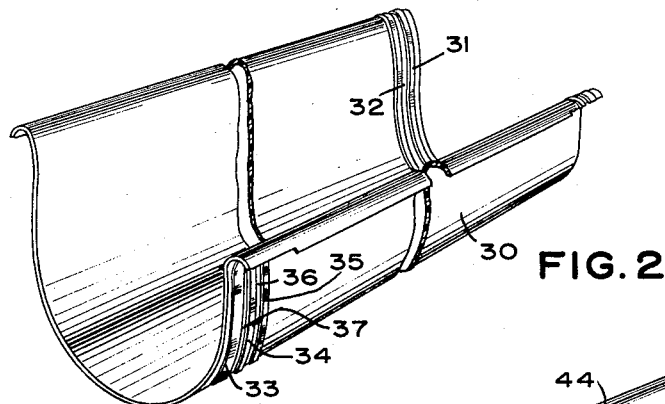
FIG. 2 is a perspective view of the plastic flume element of the invention.

FIG. 2 of the drawings shows one form of semi-rigid, self-supporting, plastic flume element 30 molded of $\frac{1}{16}''$ thick polyethylene with a trough-like cross section. In order to interchangeably and removably join together a plurality of such flume elements 30 with water-tight joints, an overlapping and interlocking joint is used in accordance with the invention. Near one end of the flume 30, on its upper surface, a plurality of upstanding interlocking ribs 31, 32 are formed or molded. Near the other end of the flume 30, on its lower surface, a plurality of interlocking ribs 33, 34, 35, leaving adjacent grooves 36, 37 complementary to ribs 31, 32 are formed so that a plurality of flume elements may be joined in water-tight overlapping interlocking relation.

Figure 3:
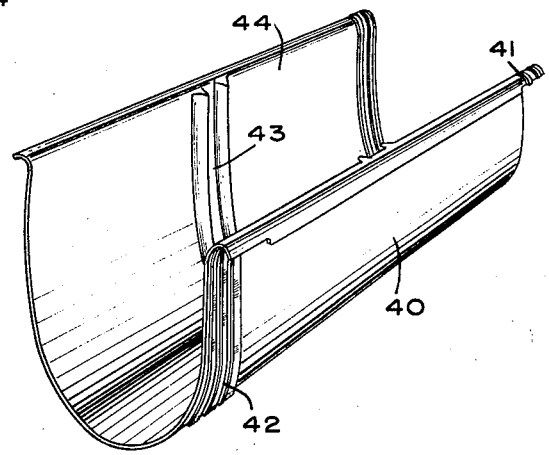
FIG. 3 is a perspective view of the plastic flume element of the invention as may be provided with a dam groove.

Referring now to FIG. 3 of the drawings, a plastic flume element 40 is shown having the interlocking formations generally shown at 41, 42 similar to the interlocking formations for the flume element 30 of FIG. 2. In this arrangement, however, a transverse groove is molded on the upper trough surface 44 intermediate the ends of the flume. This groove 43 is shaped to receive a removable dam paddle such as the dam paddle 19 (FIG. 1) of suitable height and thickness in substantially water-tight relation.

Figure 4:
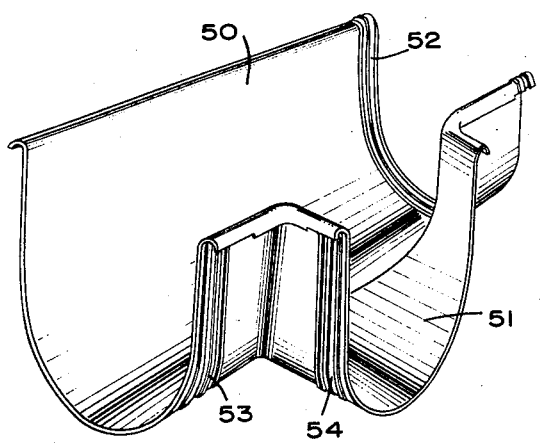
FIG. 4 is a perspective view of the plastic flume element of the invention as may be provided with a side outlet in T form.

Referring now to FIG. 4 of the drawings, an interchangeable plastic flume element 50 of the invention is provided with a side discharge outlet 51 of substantially trough-like cross section extending at an angle to the longitudinal axis of the flume. The upper surface near one end of the flume 50 is provided with the interlocking formation 52 while the under side near the other end is provided with the interlocking formation 53 similar to that previously described in connection with FIGS. 2 and 3 of the drawings. In this form of the invention, the side outlet 51 is provided on its under surface near the discharge end with an interlocking formation 54 similar to the interlocking formation 53. Obviously, in place of the interlocking formation 54, an interlocking formation similar to the formation 52 may be formed on the upper surface of the discharge end of the side outlet 51 in which case the ends of the adjoining flume elements may be reversed as should be apparent.

Figure 5:
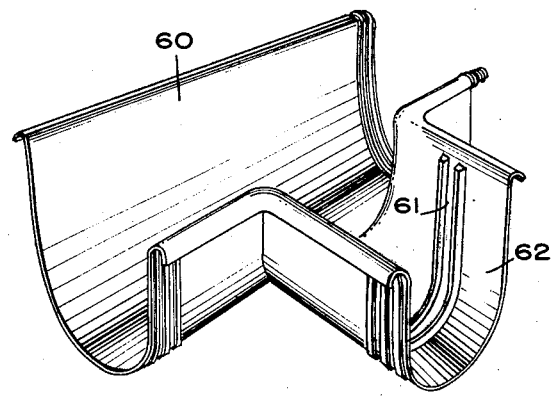
FIG. 5 is a perspective view of a plastic flume element in T form similar to that shown by FIG. 4 but having a dam paddle receiving groove formed in the side outlet flume portion.

FIG. 5 of the drawings shows a side discharge T formation flume element 60 with interlocking formations similar to that of element 50 shown in FIG. 4 of the drawings. In addition, a transverse groove 61 is formed on the upper trough surface of the side discharge outlet 62 to removably receive a dam paddle in substantially water-tight relation.

Figure 6:
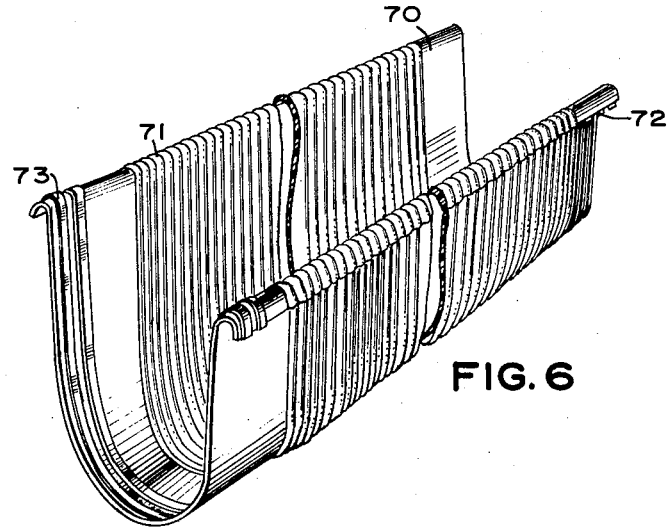
FIG. 6 is a perspective view of a plastic flume element of the invention having transverse corrugations to permit flexing along its longitudinal axis; and, FIG. 7 is a detail fragmentary cross-section of the presently preferred arrangement of complementary interlocking formations on the respective ends of two plastic flume elements to be joined.

Referring now to FIG. 6 of the drawings, an interchangeable plastic flume liner 70 having a plurality of transverse folds or corrugations 71 is shown. Of course the interlocking surfaces 72, 73 are also provided near the respective ends of the flume as previously described. The provision of the molded folds or corrugations imparts a certain amount of flexibility along the longitudinal axis of the otherwise semi-rigid flume element to enable the flume to conform to various bends and dips of an irrigation ditch as desired.

Figure 7:
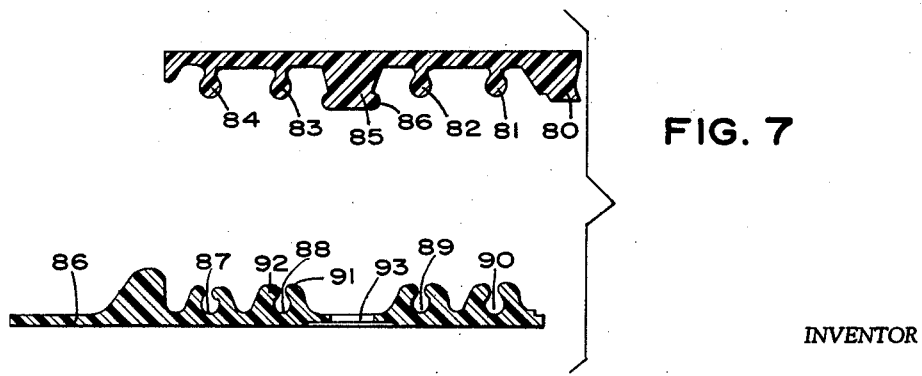

Thus far, simple forms of interlocking ribs and grooves for the interchangeable plastic flume elements have been described. Referring now to FIG. 7 of the drawings, a presently preferred arrangement of interlocking formation will be described. As shown, the under surface 80 of one end of a plastic flume liner element may be provided with depending transverse ribs 81–84 of generally bulbous cross-section. In addition, a depending stud member 85 is provided as shown. The upper surface 86 of one end of another plastic flume liner element is provided with the transverse grooves 87–90, each having overhanging lip portions such as shown at 91, 92, to receive the bulbous cross-section ribs 81–84 with a snap interlocking action. In addition, an aperture 93 is provided to receive the stud 85 of the complementary interlocking formations. It will be noted that the stud 85 is also provided with a lip portion 86 to impart a snap action and it should be borne in mind that the plastic material of the flume elements customarily has a certain amount of inherent resilience to enhance the snap interlocking action referred to.

It is believed that the use and attending advantages of the plastic flume elements of the invention are now readily apparent and no further description should be required. Various modifications may be made by those skilled in the art within the spirit of the invention and the scope of the appended claims.

I claim:
1. An interchangeable flume element comprising a length of plastic material formed with a trough-like cross-section, one end of said element having a first interlocking formation on its upper surface, the other end of said element having a second interlocking formation on its lower surface complementary to said first interlocking formation, whereby a plurality of flume elements may be interchangeably joined together with their contiguous plastic surfaces in water-tight relationship; one of said interlocking formations comprising a plurality of transverse ribs and a stud; the other of said interlocking formations comprising a plurality of transverse grooves and an aperture of complementary form to receive the ribs and stud respectively, of the complementary interlocking formation of another of said flume elements; each of said ribs and stud being substantially bulbous in cross-section and each of said grooves being provided with an overhanging lip portion whereby a snap interlocking action is obtained when two of said flume elements are joined together by their complementary interlocking formations.

2. The interchangeable flume element of claim 1 formed of self-supporting plastic material.

3. The interchangeable flume element of claim 1 in which the plastic material is polyethylene.

References Cited in the file of this patent
UNITED STATES PATENTS

| | | |
|---|---|---|
| 1,699,948 | Biedermann | Jan. 22, 1929 |
| 2,170,671 | Adler | Aug. 22, 1939 |
| 2,620,535 | Steiner | Dec. 9, 1952 |
| 2,778,194 | Van Leeuwen | Jan. 22, 1957 |
| 2,823,720 | Svec et al. | Feb. 18, 1958 |
| 2,832,202 | Norum | Apr. 29, 1958 |
| 2,867,877 | Staller | Jan. 13, 1959 |
| 3,038,205 | Plummer | June 12, 1962 |

FOREIGN PATENTS

| | | |
|---|---|---|
| 631,085 | France | Sept. 6, 1927 |
| 483,705 | Italy | Aug. 11, 1953 |

OTHER REFERENCES

American Roofer (publication), of February 1957, page 36.